United States Patent [19]

Maeda et al.

[11] Patent Number: 5,091,914
[45] Date of Patent: Feb. 25, 1992

[54] HIGH-FREQUENCY DISCHARGE PUMPING LASER DEVICE

[75] Inventors: Michinori Maeda; Akira Egawa, both of Yamanashi, Japan

[73] Assignee: Fanuc Ltd., Minamitsuru, Japan

[21] Appl. No.: 571,647

[22] PCT Filed: Jan. 17, 1990

[86] PCT No.: PCT/JP90/00054
§ 371 Date: Sep. 4, 1990
§ 102(e) Date: Sep. 4, 1990

[87] PCT Pub. No.: WO90/08415
PCT Pub. Date: Jul. 26, 1990

[30] Foreign Application Priority Data

Jan. 23, 1989 [JP] Japan ............................ 1-13560

[51] Int. Cl.$^5$ .............................................. H01S 3/03
[52] U.S. Cl. ........................................ 372/61; 372/34; 372/29
[58] Field of Search ..................... 372/61, 34, 25, 29

[56] References Cited

U.S. PATENT DOCUMENTS

| | | | |
|---|---|---|---|
| 4,785,456 | 11/1988 | Kaplan ............................ | 372/25 |
| 4,856,010 | 8/1989 | Wissman et al. ............... | 372/29 |
| 4,856,012 | 8/1989 | Takenaka ....................... | 372/29 |
| 4,866,722 | 9/1989 | Deki et al. ..................... | 372/29 |
| 4,884,279 | 11/1989 | Odagiri ........................... | 372/29 |

Primary Examiner—Léon Scott, Jr.
Attorney, Agent, or Firm—Staas & Halsey

[57] ABSTRACT

A high-frequency discharge pumping laser device is provided in which a high-frequency voltage is applied to a discharge tube to cause laser excitation. Light discharged from the discharge tube is measured by a photodiode to control an output of a laser power supply, to thereby stably control the discharging operation when the laser output is zero. The laser output has a close relationship with the discharging area inside the discharge tube, and therefore, the discharging area in which the discharging operation can be stably maintained with the output of zero is detected, to thereby stably control the discharging operation when the output is zero. Further, the length of the discharging area has an indirect relationship with the ambient temperature of the discharge tube, and the discharging operation effected when the laser output is zero is stably controlled in accordance with the ambient temperature of the discharge tube.

6 Claims, 3 Drawing Sheets

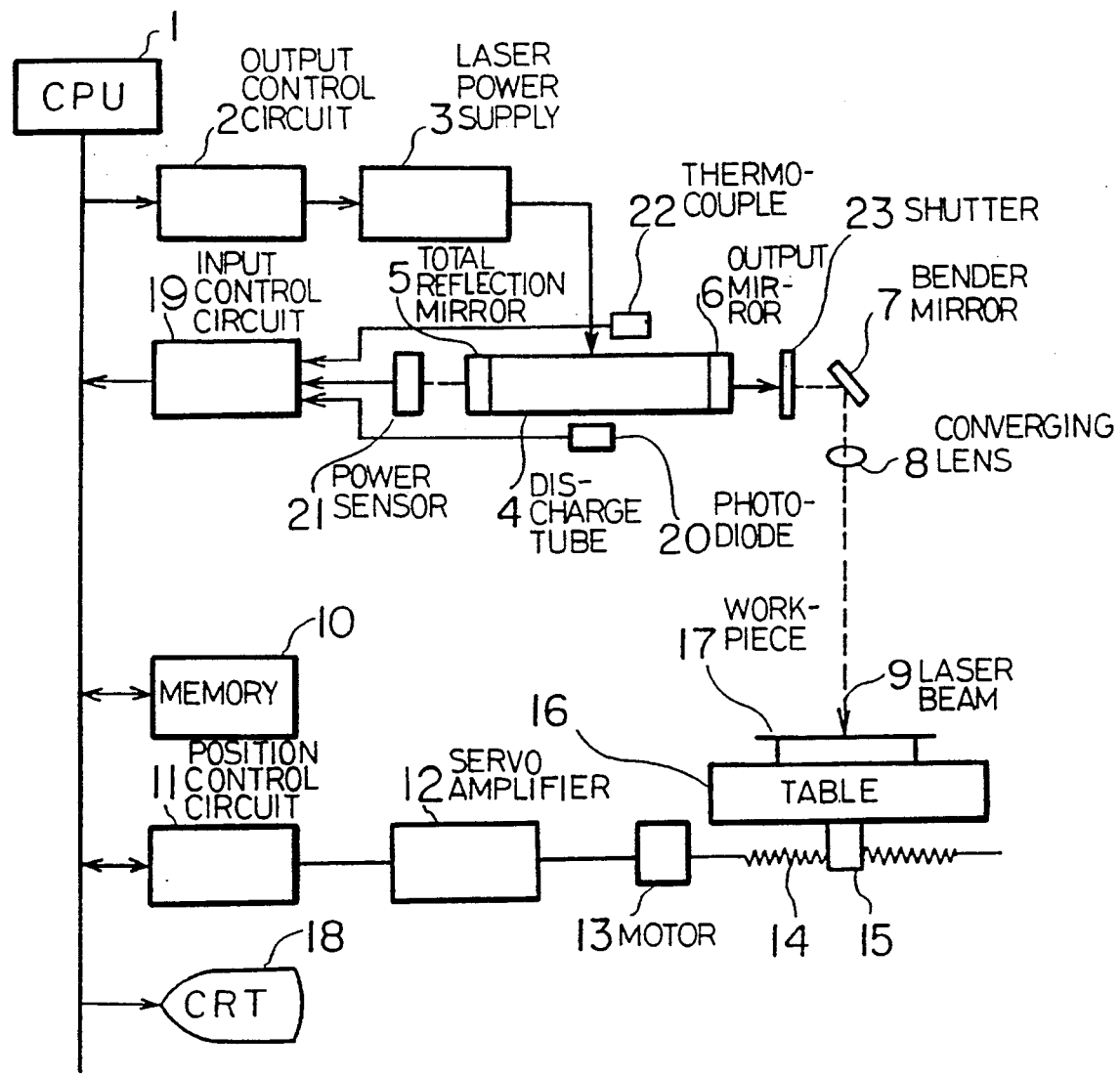
F I G. 1

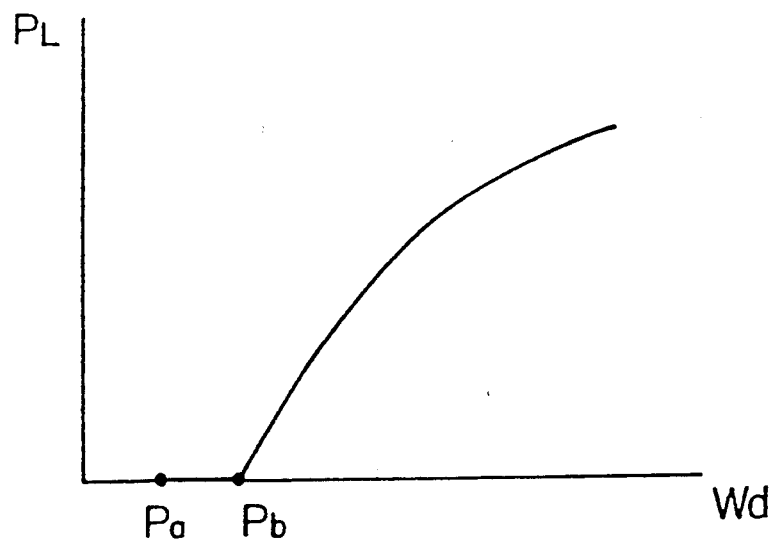
F I G. 2
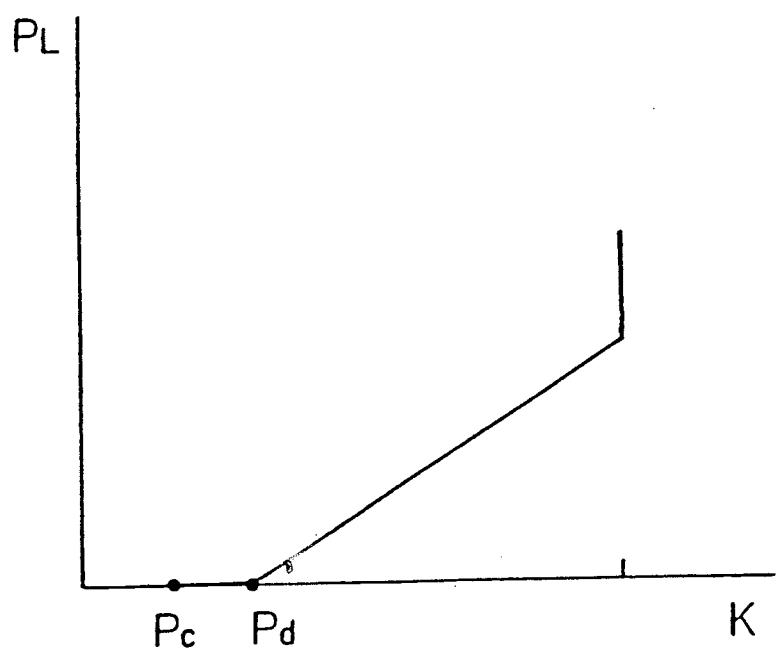
F I G. 3

HIGH-FREQUENCY DISCHARGE PUMPING LASER DEVICE

BACKGROUND OF THE INVENTION

1. Technical Field

This invention relates to a high-power, high-frequency discharge pumping laser device used for effecting a machining operation such as cutting metal or the like, and more particularly, to a high-frequency discharge pumping laser device capable of maintaining a stable discharge condition while the laser output is held at zero.

2. Background Art

A high-frequency discharge pumping laser device can produce a single mode high power laser beam, and thus is widely used for the machining of metals or the like. In such a high-frequency discharge pumping laser device, the oscillation of the laser is controlled in accordance with a machining program or the like, whereby the oscillation of the laser is set to the base discharging mode while the machining operation is not effected, even when in the operative condition, and a shutter is opened in response to a machining command to start the oscillation operation of the laser with a preset power, to effect the machining operation.

Therefore, the discharge tube must be held in the base discharging state in the machining stand-by mode, and accordingly, in the prior art, auxiliary discharge electrodes are used to effect only a discharging operation with a zero output power.

For this purpose, auxiliary electrodes other than the electrodes for effecting the laser excitation must be used, and thus the construction of the discharge tube becomes complex. Further, a power supply for the auxiliary electrodes is required, and thus the construction of the high-frequency power supply for the laser pumping also becomes complex.

In addition, it is difficult to set the laser output power to zero and continuously effect only the discharging operation by using only the main electrodes for the laser excitation, without using the auxiliary electrodes.

SUMMARY OF THE INVENTION

This invention has been created in view of the above-described problems, and an object thereof is to provide a high-frequency discharge pumping laser device having a simple construction and wherein the discharging operation in the machining stand-by mode can be stably controlled.

In this invention, to solve the above problem, a high-frequency discharge pumping laser device is provided in which a high-frequency voltage is applied to a discharge tube to cause a laser oscillation and which includes a light measuring means for measuring light discharged from the discharge tube, wherein the discharged light is used as a feedback signal to control an output of a laser power supply, to thereby stably control the discharging operation when the laser output is zero.

Further, a high-frequency discharge pumping laser device is provided, wherein the ambient temperature of the discharge tube is used instead of the discharged light as a feedback signal, to thereby stable control the discharging operation when the laser output is zero.

The laser output has a close relationship with the discharging area in the discharge tube, and therefore, the discharging area in which the discharging operation can be stably maintained with an output of zero is detected to thereby stably control the discharging operation when the laser output is zero.

Further, the length of the discharging area has an indirect relationship with the ambient temperature of the discharge tube, and the discharging operation also can be stably controlled according to the ambient temperature of the discharge tube when the laser output is zero.

BRIEF DESCRIPTION OF THE DRAWINGS

FIG. 1 is a schematic diagram showing the hardware construction of an NC laser device of an embodiment of a high-frequency discharge pumping laser device of this invention;

FIG. 2 is a diagram showing the relationship between the laser output and the power input to the discharge tube;

FIG. 3 is a diagram showing the relationship between the discharging area and an output;

DESCRIPTION OF THE PREFERRED EMBODIMENTS

Figure 4:
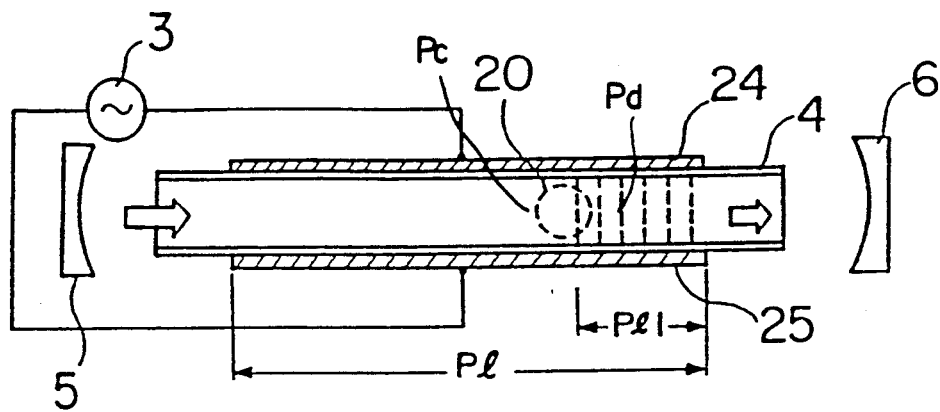
FIG. 4 is a side view showing the discharge tube in detail.

An embodiment of this invention will be described with reference to the accompanying drawings.

FIG. 1 is a diagram showing the hardware construction of an NC laser device for effecting a laser output controlling method of this invention. In the drawing, a processor (CPU) 1 globally controls the NC laser device, an output control circuit 2 converts an output command value to a current command value and outputs the same, and contains a DA converter for converting a digital value to an analog output, and a laser power supply 3 rectifies a commercial power supply and outputs a high-frequency power of approximately 2 MHz in accordance with a command from the output control circuit 2.

A laser gas is circulated in a discharge tube 4 and a high-frequency power from the laser power supply 3 is applied thereto to cause a discharge, thereby exciting the laser gas and emitting a laser beam by a stimulated emission. A total reflection mirror 5 and an output mirror 6 constitute a laser oscillator, and the laser beam receives energy from the excited laser gas and is amplified while reciprocating between the total reflection mirror 5 and output mirror 6, while part of the laser light is output from the output mirror 6 to the exterior.

The direction of output laser beam 9 is changed by a bender mirror 7, while a shutter 23, described later, is open, and is projected onto the surface of a workpiece 17 by a converging lens 8.

A machining program, parameters and the like are stored in a memory 10, and complementary metal oxide semiconductor devices (CMOSs) and the like having a battery backup system are used therefore.

An output of a position control circuit 11 is amplified by a servo amplifier 12 to control the rotation of a servomotor 13 and move a table 16 via a ball screw 14 and a nut 15, to thereby control the position of the workpiece 17. In this example, the position control circuit 11 and the like are indicated only for a single axis, but it is actually necessary to provide position control circuits and the like for two axes, in order to control the table 16. Nevertheless, since the constructions thereof are the same, they are omitted from the drawing.

A display device 18 displays the position of the table, machining speed, machined shape and the like, and a CRT, liquid crystal display device or the like is used therefor.

The shutter 23 interrupts the laser beam in an operation other than the machining operation and is formed of an aluminum plate or copper plate plated with gold on the surface thereof. The shutter 23 is opened or closed in accordance with commands from the processor 1, and functions to reflect the laser beam 9 output from the output mirror 6 when open and prevent such an output to the exterior when closed.

A power sensor 21 measures the output power of the laser oscillator device and a monitoring laser beam which has passed through part of the total reflection mirror 5 and is output, by using a thermocouple, photoelectric converting element or the like. Numeral 22 denotes a thermocouple used as a temperature sensor for measuring the ambient temperature of the discharge tube 4. A photodiode 20 detects light discharged from the discharge tube 4.

The power sensor 21, temperature sensor 22, and photodiode 20 detect the discharging state of the discharge tube 4 and are used as feedback signals for stably controlling the discharging state of the discharge tube 4 in the laser machining stand-by mode or when the laser output is zero, and for this purpose, the feedback signals are input to an input control circuit 19. The input control circuit 19 contains an AD converter and a switching circuit therein, receives analog signals from the sensors, and converts the same to a digital signal which is in turn read by the processor 1. The feedback signals from the sensors are used to stably control the discharging state when the laser output is zero. An air blower for circulation of the laser gas and a cooling unit for the laser gas are omitted in FIG. 1.

FIG. 2 is a diagram showing the relationship between power input to the discharge tube and the laser output. In the drawing, an abscissa indicates the power input to the discharge tube 4 and an ordinate indicates a laser output. When the power input to the discharge tube 4 is gradually increased, the discharging state is reached at a point Pa, but in this case, the laser output is zero. Thereafter, when the input power has exceeded a point Pb, the laser output rises as shown in the drawing. Therefore, the state at the point Pb is most preferable in the laser machining stand-by mode.

FIG. 3 shows the relationship between the discharging area and the output. An abscissa indicates the ratio of an actual discharging area to a dischargeable area. Namely, assuming that the actual area is Pl1 and the dischargeable area is Pl, then the ratio K thereof is expressed as follows:

$$K = Pl1/Pl$$

In this case, the dischargeable area is substantially equal to the length of the electrode of the discharge tube 4. As clearly seen from FIG. 3, when K lies between a point Pc and a point Pd, the laser output is zero, and when it has exceeded the point Pd, i.e., when the discharging area has exceeded a preset value, the laser output varies substantially in proportion to K, and after K is set to 1, the laser output is increased as the discharging current density is increased.

FIG. 4 is a view showing the discharge tube in detail. In FIG. 4, portions which are the same as those in FIG. 1 are denoted by the same reference numerals, and therefore, an explanation thereof is omitted. Electrodes 24 and 25 are disposed on both ends of a discharge tube 4 and are connected to the laser power supply 3. The electrodes 24 and 25 are disposed in parallel on the discharge tube 4 in the drawing but may be formed in other configurations such as a spiral form. As explained with reference to FIG. 3, the lengths of the electrodes 24 and 25 are substantially equal to the dischargeable area Pl and the actual discharging area is Pl1. A photodiode 20 detects light discharged from the discharge tube 4 and the signal is converted to a digital signal by the input control circuit 19, as described with reference to FIG. 1, and is read by the processor 1.

Therefore, an output signal of the photodiode at the point Pd in FIG. 3 is detected as a discharging point which is at an optimum when the laser output is zero, and the output of the laser power supply 3 may be controlled to reach the discharging state. Note, a phototransistor can be used instead of the photodiode.

Figure 5:
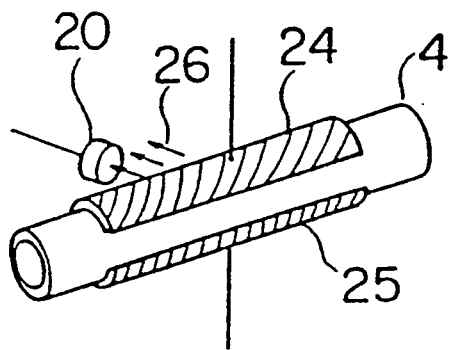
FIG. 5 is an external, perspective view of FIG. 4.

FIG. 5 is an external view of FIG. 4, and indicates a state in which light 26 discharged from the discharge tube 4 is detected by the photodiode 20.

Further, since the discharging area and the ambient temperature are set in a preset relationship, it becomes possible to measure the ambient temperature of the discharge tube 4 by using the thermocouple 22 of FIG. 1 and feeding back the temperature signal to the input circuit to control the laser output when the laser output is zero. Since the temperature has a large time constant, however, the precision is slightly reduced in comparison with the case of the discharged light.

Further, in addition to the control by using the temperature or light discharged from the discharge tube 4, it is possible to pass a part of the laser beam 9 incident on the total reflection mirror 5, measure the same by a power sensor 21, and use the signal in an auxiliary manner. That is, when the point Pb in FIG. 3 or point Pd in FIG. 4 is exceeded, this can be detected by the power sensor 21 to lower the output of the laser power supply 3. Note, it is not necessary to provide all of these three sensors, and they can be used selectively in accordance with a desired output control. In the above description, the discharging control is explained as an example which is effected by the NC laser device, but it can be controlled by another control device in the same manner.

As described above, according to the high-frequency discharge pumping laser device of this invention, the discharging state when the laser output is zero is controlled by the ambient temperature or light discharged from the discharge tube, and thus the control can be easily effected without using the auxiliary electrodes or the like and the construction of the discharge tube can be simplified.

We claim:

1. A high-frequency discharge pumping laser device in which a high-frequency voltage is applied to a discharge tube to cause laser oscillation and which comprises:

light measuring means for measuring light discharged from said discharge tube, said discharge tube having a dischargeable area Pl and an actual discharging area Pl1, said light measuring means being disposed adjacent to said discharge tube at a position of the Pl, said position defined by a ratio of Pl1 and Pl, where the laser output is zero, wherein the measured discharge light is used as a feedback signal to control an output of a laser power supply, to thereby stably control the discharging operation when the laser output is zero.

2. A high-frequency discharge pumping laser device according to claim 1, in which a feedback signal from a power sensor is also used to stably control the discharging operation when the laser output is zero.

3. The device as recited in claim 1, wherein the light measuring means is one of a photodiode and a phototransistor.

4. A high-frequency discharge pumping laser device in which a high-frequency voltage is applied to a discharge tube to cause laser excitation and which comprises:

temperature measuring means for measuring the ambient temperature of said discharge tube, said discharge tube having a dischargeable area Pl and an actual discharging area Pl1, said temperature measuring means being disposed adjacent to said discharge tube at a position of the Pl, said position defined by a ration of Pl1 and Pl, where the laser output is zero, wherein the measured temperature is used as a feedback signal to control an output of a laser power supply, to thereby stably control the discharging operation when the laser output is zero.

5. A high-frequency discharge pumping laser device according to claim 4, in which a feedback signal from a power sensor is also used to stably control the discharging operation when the laser output is zero.

6. The device as recited in claim 4, wherein the temperature measuring means is a thermocouple.

* * * * *